United States Patent [19]

Meyers

[11] Patent Number: 4,538,424
[45] Date of Patent: Sep. 3, 1985

[54] AIR COOLING UNIT FOR VEHICLE

[75] Inventor: Joseph Meyers, Cloverdale, Calif.

[73] Assignee: Gordon G. Waltenspiel, Santa Rosa, Calif.

[21] Appl. No.: 580,493

[22] Filed: Feb. 15, 1984

[51] Int. Cl.³ ............................................. F25B 27/00
[52] U.S. Cl. .................................... 62/236; 62/238.3; 62/239
[58] Field of Search ........................ 62/238.3, 239, 236

[56] References Cited

U.S. PATENT DOCUMENTS

| | | | |
|---|---|---|---|
| 2,592,712 | 4/1952 | Knoy | 62/238.3 X |
| 2,740,904 | 4/1956 | Goss | 62/236 X |
| 2,839,274 | 6/1958 | Polin | 62/238.3 X |
| 3,225,560 | 12/1965 | Doebeli | 62/236 |
| 4,253,310 | 3/1981 | Sokolov | 62/239 X |
| 4,253,311 | 3/1981 | Blomberg | 62/239 X |

Primary Examiner—Lloyd L. King
Attorney, Agent, or Firm—Townsend and Townsend

[57] ABSTRACT

An air cooling unit for a vehicle having a source of energy, such as heat from crankcase oil or transmission oil or a source of electrical power, such as an alternator. The cooling unit is of the absorption type and includes a condenser in series with an evaporator, an absorber and a boiler. The cooling unit is provided with a refrigerant, such as ammonia, and an absorption fluid, such as water. Hydrogen gas can optionally be placed in the cooling unit to move between the evaporator and the absorber to reduce the partial pressure of the refrigerant. A return line in the form of a coil extends from the boiler to an inlet of the absorber to return the absorption fluid to the absorber after the absorption fluid has been separated by heat from the refrigerant gas in the boiler. All of the components of the cooling unit are sized, shaped and located so that the cooling unit provides a compact package capable of being fitted into a relatively small space. A fan can be provided to blow air past the evaporator and through the vehicle for cooling the interior thereof. In one form of the cooling unit, the boiler is provided with heated oil to serve as a heat source, the oil being taken either from the crankcase of the vehicle or from the transmission of the vehicle. In another form of the invention, the boiler includes an electrical resistance heating element in a housing for receiving a mixture of refrigerant and absorption fluid from the absorber, the electrical resistance heating element having means for coupling the same to an electrical energy source, such as the alternator of the vehicle.

15 Claims, 2 Drawing Figures

U.S. Patent    Sep. 3, 1985    4,538,424
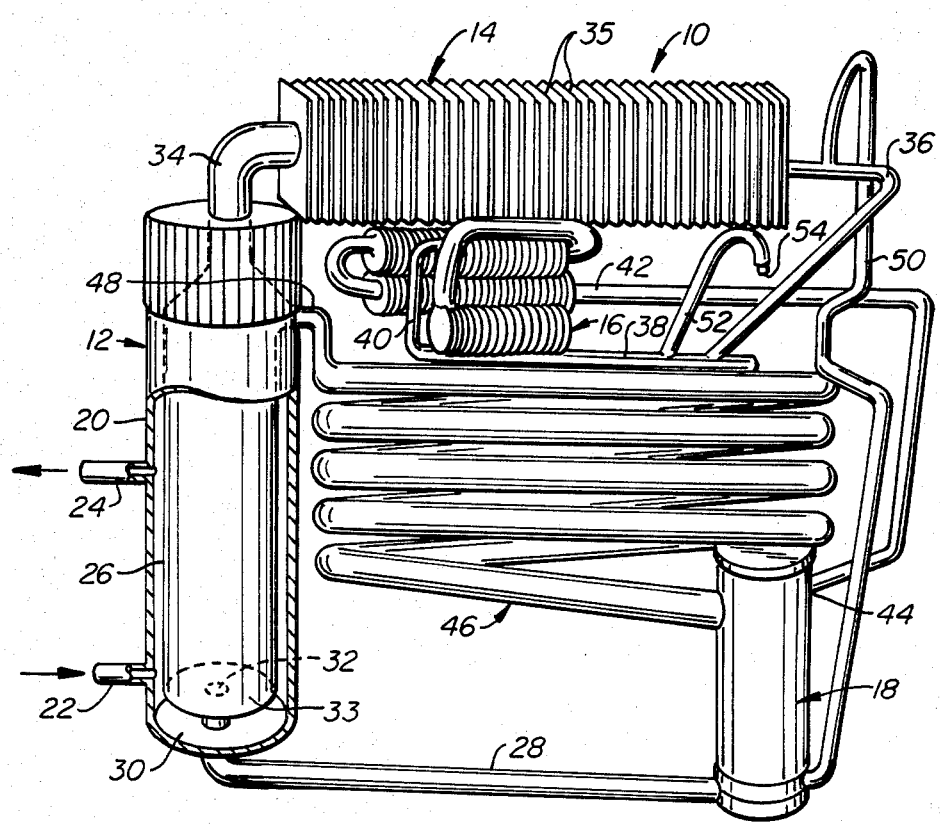
FIG._1.
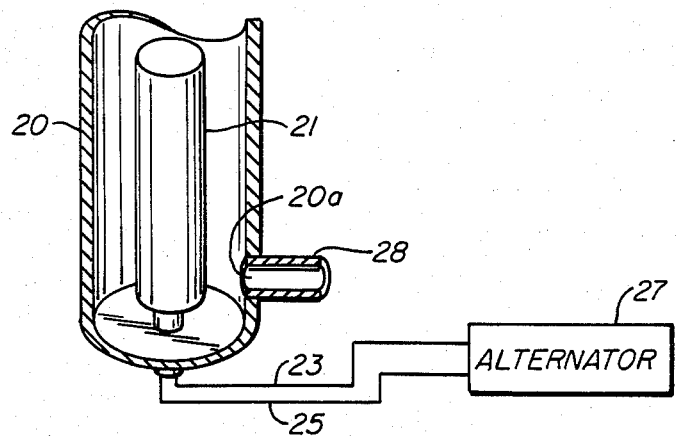
FIG._2.

AIR COOLING UNIT FOR VEHICLE

BACKGROUND OF THE INVENTION

1. Field of the Invention

This invention relates to improvements in air conditioning units for vehicle, and more particularly, to a cooling unit of the absorption type which can be coupled to a vehicle and can operate without the need for moving parts while being coupled to a source of energy other than the vehicle engine.

2. Description of the Prior Art

A conventional air conditioning unit for a vehicle is powered by the engine of the vehicle, thereby putting an additional load on the engine, especially when the vehicle is accelerating. Typically, an air conditioning unit for a vehicle uses a compressor which must be coupled by a belt and pulley assembly to the vehicle engine, causing a decrease in the power available from the engine for acceleration at times when it is most clearly needed especially in small, European type cars in the 1,000 cc to 1,500 cc displacement range. A compressor of a conventional air conditioning unit for a vehicle is required to compress the refrigerant before it is liquified in the condenser. The need for engine power to compress the refrigerant causes a heavy drain on the vehicle engine and causes wear on the engine as well as a loss in gas mileage. Maintenance is also a problem in the use of conventional air conditioning units for vehicles.

Because of the above problem inherent in the use of conventional air conditioning units for vehicles, a need has arisen for an improved vehicle air conditioning unit which does not get power directly from the engine.

SUMMARY OF THE INVENTION

The present invention satisfies the aforesaid need by providing an improved air conditioning or cooling unit for a vehicle, the unit of the present invention being of the absorption type and having no moving parts except for fluids flowing through tubes and components of the unit itself. To this end, the air cooling unit of the present invention includes a boiler coupled in series with a condenser, an evaporator and an absorber. The boiler has means near its lower end for receiving a mixture of a refrigerant and an absorption fluid from the absorber itself and for heating such mixture to create a convection current and to cause a separation of the refrigerant in the form of a vapor from the absorption fluid.

The heating of the mixture can be done by using heat energy supplied by heated crankcase or transmission oil or by an electrically actuated resistance element which can be coupled through electrical leads to an electrical power source, such as the alternator, of the vehicle. In either case, no moving parts are needed to operate the air cooling unit. In the case of crankcase or transmission oil, the heat energy is caloric in nature which would ordinarily be dissipated to the atmosphere and lost for all practical purposes. In the case of an electrical resistance heating element, the alternator of a vehicle ordinarily has sufficient capacity to accommodate additional components so that there would be no excessive drain on the alternator itself. Thus, the alternator will be more efficiently used when the vehicle is in operation.

The components of the cooling unit of the present invention are arranged with respect to each other so that the cooling unit itself is compact in size and shape. Thus, the cooling unit can be fitted into a relatively small space yet it can operate in a normal fashion to cool air driven by a fan or other means past the evaporator. Thus, the cooled air can be directed into the vehicle interior for cooling the occupants of the vehicle.

The primary object of the present invention is to provide an improved air cooling unit for a vehicle in which the air cooling unit is operated from the energy supplied from an energy source other than directly from the vehicle engine yet the cooling unit is efficient in operation and is substantially compact in size and shape to fit in a minimal of space without sacrificing the efficiency of an air cooling unit thereof.

Another object of the present invention is to provide an air cooling unit of the type described wherein the cooling unit is of the absorption type and uses a caloric or electrical energy source associated with the vehicle, to thereby eliminate the need for coupling the cooling unit directly to the engine of the vehicle to thereby assure that substantially maximum power of the engine will be available at all times while the air cooling unit is in operation.

Other objects of this invention will become apparent as the following specification progresses, reference being had to the accompanying drawing for an illustration of several embodiments of the invention.

IN THE DRAWING

FIG. 1 is a perspective view of the vehicle refrigeration unit of the present invention, parts being broken away and in section to illustrate details of construction; and FIG. 2 is a fragmentary view of a modified form of one component of the refrigeration unit of FIG. 1.

DETAILED DESCRIPTION OF THE PREFERRED EMBODIMENT

The improved air cooling unit of the present invention is broadly denoted by the numeral 10 and is of the absorption type. In the present invention, no moving parts are used to operate unit 10.

Unit 10 comprises a boiler or heat generator 12, a condenser 14, an evaporator 16 and an absorber 18. All of these parts are connected by tubes or pipes and are sufficiently close together so that unit 10 is compact in size and shape so that it will fit in a small space. Unit 10 is a closed system and contains a suitable refrigerant such as ammonia, an absorption fluid, such as water, and optionally a quantity of hydrogen. The pressure of the refrigerant is sufficient to condense the refrigerant at ordinary ambient temperature.

Boiler 12 comprises an outer housing 20 provided with a fluid inlet 22 and a fluid outlet 24 above inlet 22. Housing 20 is typically cylindrical in shape, and the central axis of housing 20 is generally upright. Inlet 22 and outlet 24 are coupled to the crankcase of the vehicle so that the hot oil from the crankcase during operation of the vehicle can circulate through the interior of housing 20. In the alternative, heated oil from the transmission of the vehicle can be circulated through housing 20 to serve as a heat source.

A tubular member 26 is disposed within housing 20 and is adapted to receive a mixture of water and ammonia vapor from absorber 18 by way of tube 28. To this end, one end of tube 28 is coupled to the absorber and the other end of the tube passes through the bottom 30 of housing 20 and into the bottom 33 of cylindrical member 26 which has a port 32 for the entry of the mixture of water and ammonia into cylindrical member 26. The outer diameter of member 26 is less than the inner diameter of housing 20 to present a space surrounding member 26, whereby the heated fluid, i.e., oil, in housing 20 will be in heat exchange relationship to the water-ammonia mixture in member 26.

The upper end of member 26 is coupled by a short tube 34 to the inlet end of condenser 14. For purposes of illustration, condenser 14 is formed of one or more tubes (not shown) having metal fins 35 thereon.

The outlet end of the condenser is coupled by a tube 36 to a tube 38 which leads to the inlet pipe 40 of evaporator 16. For purposes of illustration, evaporator 16 is comprised of a number of finned coils or tubes coupled in series with each other, the evaporator having an outlet pipe 42 leading away therefrom and terminating at an inlet 44 of absorber 18. Evaporator 16 is located underneath or below and to the side of condenser 14 so as to render unit 10 compact in construction. Evaporator 16 is so placed that a fan adjacent thereto can blow cool air into the vehicle, thereby cooling the interior space of the vehicle.

A coil 46 is between housing 20 and absorber 18 and below condenser 14 and evaporator 16. Coil 46 has an inlet end 48 in fluid communication with the interior of member 26 near the upper end thereof. The purpose of the coil 46 is to direct water separated by heat from the ammonia vapor in the upper portion of member 26 back into the absorber for mixture with the ammonia entering the absorber at inlet 44 from pipe 42. The coil is in heat exchange relationship to the ambient air to cool the water and also to further reduce its vapor pressure so as to increase the efficiency of operation of absorber 18.

The hydrogen, if used in the system, flows between the evaporator and the absorber. Typically, the hydrogen is placed above the liquid ammonia in the evaporator to reduce the partial pressure of the ammonia vapor in accordance with Dalton's Law of Partial Pressures. Dalton's Law states: The total pressure of a gas mixture is equal to the sum of the partial pressures of the individual gases.

A tube 50 is connected at one end to tube 36 and at the opposite end to the absorber 18 near the lower end of the absorber. Tube 50 is used to return the hydrogen gas from the absorber to the evaporator. A trap between the condenser and the evaporator can be provided to assure that hydrogen gas does not enter the condenser. A relief tube 52 coupled with tube 38 has a plug 54 which opens the system in the event of excessive internal pressures therewithin.

In operation, and assuming that a heated fluid, such as crankcase oil or transmission oil, is flowing under the action of a conventional oil pump of the vehicle into and through housing 20, unit 10 operates with the flow of vaporized, high-pressure ammonia flowing out of member 26 and into condenser 14 through pipe 34. The heated, high-pressure ammonia vapor is reduced to a liquid in the condenser and flows out of the condenser through tube 36, tube 38, pipe 40 and into evaporator 16. The hydrogen gas in the evaporator operates to reduce the partial pressure of the ammonia vapor in accordance with Dalton's Law of Partial Pressures as recited above.

In the evaporator, the partial ammonia pressure is less than the total pressure by the value of the partial pressure of the hydrogen. The lesser ammonia pressure results in the evaporation of the ammonia with the absorption of heat from the air surrounding the evaporator. The cool heavy gas mixture of hydrogen and ammonia vapors formed in the evaporator leaves the evaporator 16 and passes by gravity through pipe 42 to inlet 44 of absorber 18. Pipe 42 will be inclined or extend downwardly to allow for this gravity flow of the gas mixture.

Since the weight of a gas is proportional to its molecular weight, and the molecular weight of ammonia is 17 and the molecular weight of hydrogen is 2, it follows that the specific weight of the ammonia is greater than that of hydrogen. The difference in specific weight is alone sufficient to initiate and maintain circulation of hydrogen between the evaporator and the absorber.

In the absorber, a flow of weak solution (water weak in ammonia) flows into the absorber from coil 46 and into direct contact with the ammonia gas. The ammonia is absorbed by the water and, since the hydrogen is practically insoluble in water, the hydrogen passes from the absorber to the evaporator by way of pipe 50. The mixture of the water and ammonia provides a strong water-ammonia solution which flows out of the absorber, through tube 28 and into the bottom port 32 of member 26. Since the solution in member 26 is heated, convection causes the continuous movement upwardly of the water-ammonia solution in member 26. Thus, in effect, the convection action pumps the strong water-ammonia solution into and through member 26. Because heat is applied to the water-ammonia solution, ammonia vapor is released from the water and passes upwardly into and through tube 34 and into the condenser. The water separated from the ammonia flows out of member 26 into the inlet end 48 of coil 46, through coil 46, and back into the absorber 18.

It is to be noted that the cooling unit 10 operates in a manner to require no compressor, no belts, no pulleys and no maintenance. There are no moving parts other than the fluids flowing through the various tubes of the closed system. The system is sufficiently compact in size and shape so as to fit into a small space yet the invention can operate on caloric energy, that is normally wasted and dissipated to the atmosphere. Such caloric energy includes the energy in heated oil from the vehicle crankcase or from the vehicle transmission.

A modification of unit 10 is shown in FIG. 2 wherein, instead of using a heated fluid as a heat source for heating the water-ammonia mixture flowing from absorber 18 toward and to condenser 14, an electrically actuated heat source can be used instead. To this end, housing 20 is shown as having an end opening 20a coupled with tube 28 from absorber 18. An electrical resistance heating element 21 is located within housing 20 and has a pair of leads 23 and 25 which exit from housing 20 and are coupled to the alternator 27 of the vehicle for supplying electrical energy to the heating element 21. In this way, the water-ammonia mixture in housing 20 is in heat exchange relationship to heating element 21. A suitable heat sensor and cutoff switch operated by the sensor can be used to control the heat energy supplied to the water-ammonia mixture in housing 20, if desired.

I claim:

1. A refrigeration unit for a vehicle comprising:
   a condenser;
   an evaporator coupled with the condenser for receiving a liquified refrigerant therefrom;
   an absorber coupled with the evaporator for receiving vaporized refrigerant by gravity flow directly from the evaporator and an absorption fluid capable of absorbing the refrigerant vapor; and a boiler having a lower end in fluid communication with the absorber and an upper end in fluid communication with the condenser, said boiler having means forming at least part of a heat source for use in heating a mixture of the absorption fluid and the refrigerant in the boiler to create a convection current therein, to vaporize the refrigerant therein, and to separate the vaporized refrigerant from the absorption fluid therein, whereby the vaporized refrigerant can flow directly from the boiler to the condenser, there being means between the boiler and the absorber for directly returning by gravity flow the absorption fluid separated in the boiler from the vaporized refrigerant to the absorber, said heat source adapted to be coupled to an energy source of the vehicle.

2. A refrigeration unit as set forth in claim 1, wherein said forming means includes a housing having a fluid inlet and a fluid outlet and adapted to be coupled to the vehicle to receive a flow of crankcase oil therefrom.

3. A refrigeration unit as set forth in claim 1, wherein said forming means includes a housing having a fluid inlet and a fluid outlet and adapted to be coupled to the vehicle to receive a flow of transmission oil therefrom.

4. A refrigeration unit as set forth in claim 1, wherein said forming means comprises an electrical resistance heater in the boiler and having means for coupling the same to an electrical power source of a vehicle.

5. A refrigeration unit as set forth in claim 1, wherein said returning means comprises a coil extending between and coupled directly to the boiler and the evaporator.

6. A refrigeration unit as set forth in claim 1, wherein is included a quantity of hydrogen gas moveable with the refrigerant to the absorber from the evaporator for lowering the partial pressure of the ammonia vapor in the evaporator, there being a tube connected directly to the absorber and the evaporator to return hydrogen gas separated from the refrigerant in the absorber.

7. A refrigeration unit as set forth in claim 1, wherein said refrigerant is ammonia and the absorption fluid is water.

8. A refrigeration unit as set forth in claim 1, wherein said boiler comprises an outer housing having a refrigerant outlet near the upper end thereof, the condenser being elongated and extending laterally from the refrigerant outlet of the housing, said evaporator being below the condenser and adjacent to the side of the housing, the absorber being below the evaporator and spaced laterally of the housing, said returning means comprising a coil between the housing and the absorber, said coil being below the evaporator.

9. A refrigeration unit as set forth in claim 8, wherein said boiler further includes an inner, tubular member in the outer housing, said housing having a fluid inlet and fluid outlet for receiving a heated fluid, the inner member being smaller in size than the interior space of the housing so that a heated fluid directed into the housing will be in heat exchange relationship to the interior of the member.

10. A refrigeration unit as set forth in claim 9, wherein the housing is generally cylindrical and has a generally upright central axis.

11. A refrigeration unit as set forth in claim 9, wherein said inner member has a side outlet near the upper end thereof, said side outlet being coupled to said returning means to direct the absorption fluid out of the inner member, and into the returning means for flow to the absorber.

12. A refrigeration unit as set forth in claim 1, wherein said boiler comprises an outer housing for receiving said mixture, an electrical resistance heating element within the housing for heating a fluid therewithin, said heating element having means for coupling the same to an electrical power source of a vehicle.

13. A refrigeration unit for a vehicle having an internal combustion engine comprising:
   a boiler having a lower fluid inlet and a pair of upper fluid outlets;
   a condenser extending laterally from the boiler and having an inlet and an outlet;
   means coupling one of the fluid outlets of the boiler directly to the inlet of the condenser;
   an evaporator below the condenser and to the side of the boiler, said evaporator having an inlet and an outlet;
   means coupling the outlet of the condenser directly with the inlet of the evaporator;
   an absorber below the evaporator and spaced from the boiler, said absorber having a pair of inlets and an outlet;
   means coupling the outlet of the evaporator directly to one inlet of the absorber, said outlet of the absorber being coupled directly to the fluid inlet of the boiler;
   means defining a fluid passage directly connecting the other fluid outlet of the boiler with the other fluid inlet of the absorber; and
   means for coupling the boiler in heat exchange relationship with a source of energy on the vehicle to provide heat energy to a fluid flowing through the boiler to create an upward flow of the fluid toward the condenser by convection.

14. A refrigeration unit as set forth in claim 13, wherein the boiler is comprised of an outer housing having a lower inlet for the heated fluid and an upper outlet for the heated fluid, and an inner tubular member within the housing, the inner tubular member being coupled at its lower end to the outlet of the absorber and having the first and second outlets of the boiler near the upper end of the tubular member, said energy source of the vehicle being heated oil.

15. A refrigeration unit as set forth in claim 13, wherein said boiler includes an outer housing having a lower fluid inlet, and an electrical resistance element within the housing, said energy source of the vehicle being an electrical energy source, said resistance element having means for coupling the same to said electrical energy source.

* * * * *